Dec. 23, 1952  D. I. BABITCH  2,622,399
WINDSHIELD WIPER MOTOR
Filed Aug. 5, 1948  3 Sheets-Sheet 1
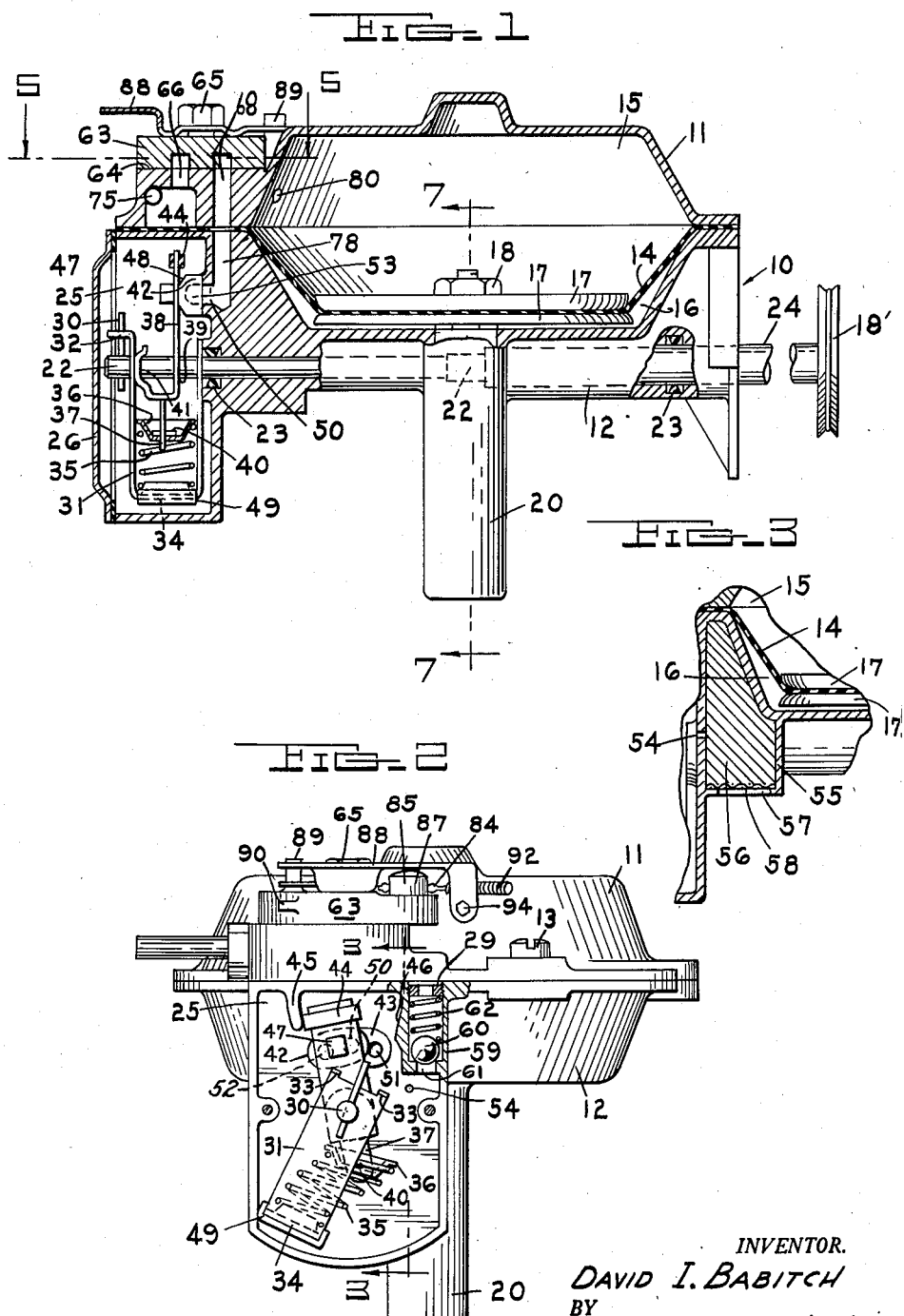
INVENTOR.
DAVID I. BABITCH
BY
ATTORNEYS Dec. 23, 1952 D. I. BABITCH 2,622,399
WINDSHIELD WIPER MOTOR
Filed Aug. 5, 1948 3 Sheets-Sheet 2
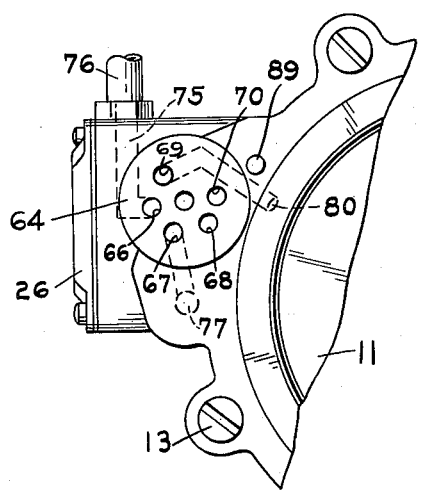
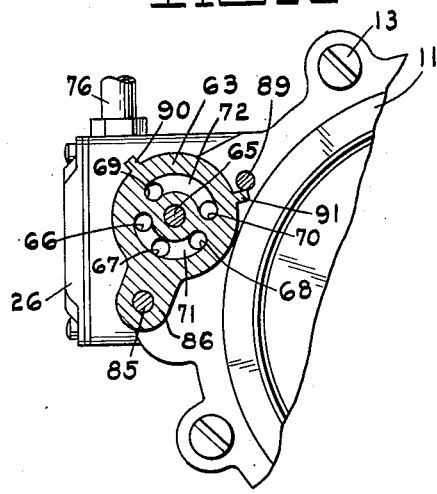
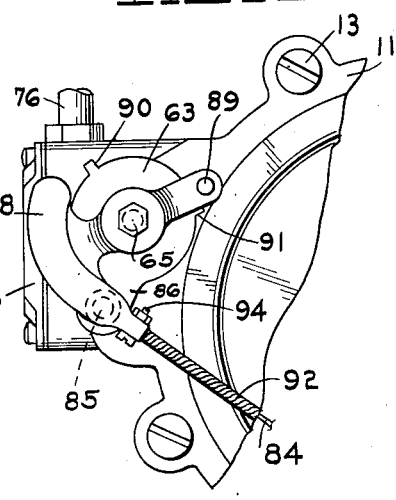
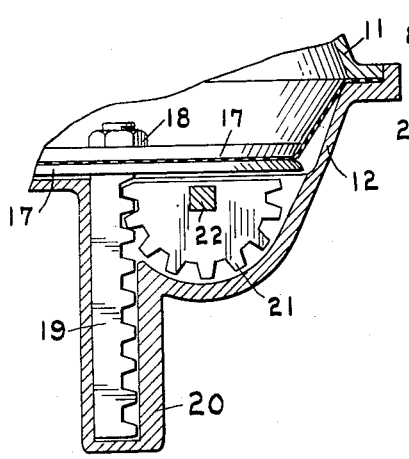
INVENTOR.
DAVID I. BABITCH
BY
Barnes, Kisselle, Laughlin & Rausch
ATTORNEYS

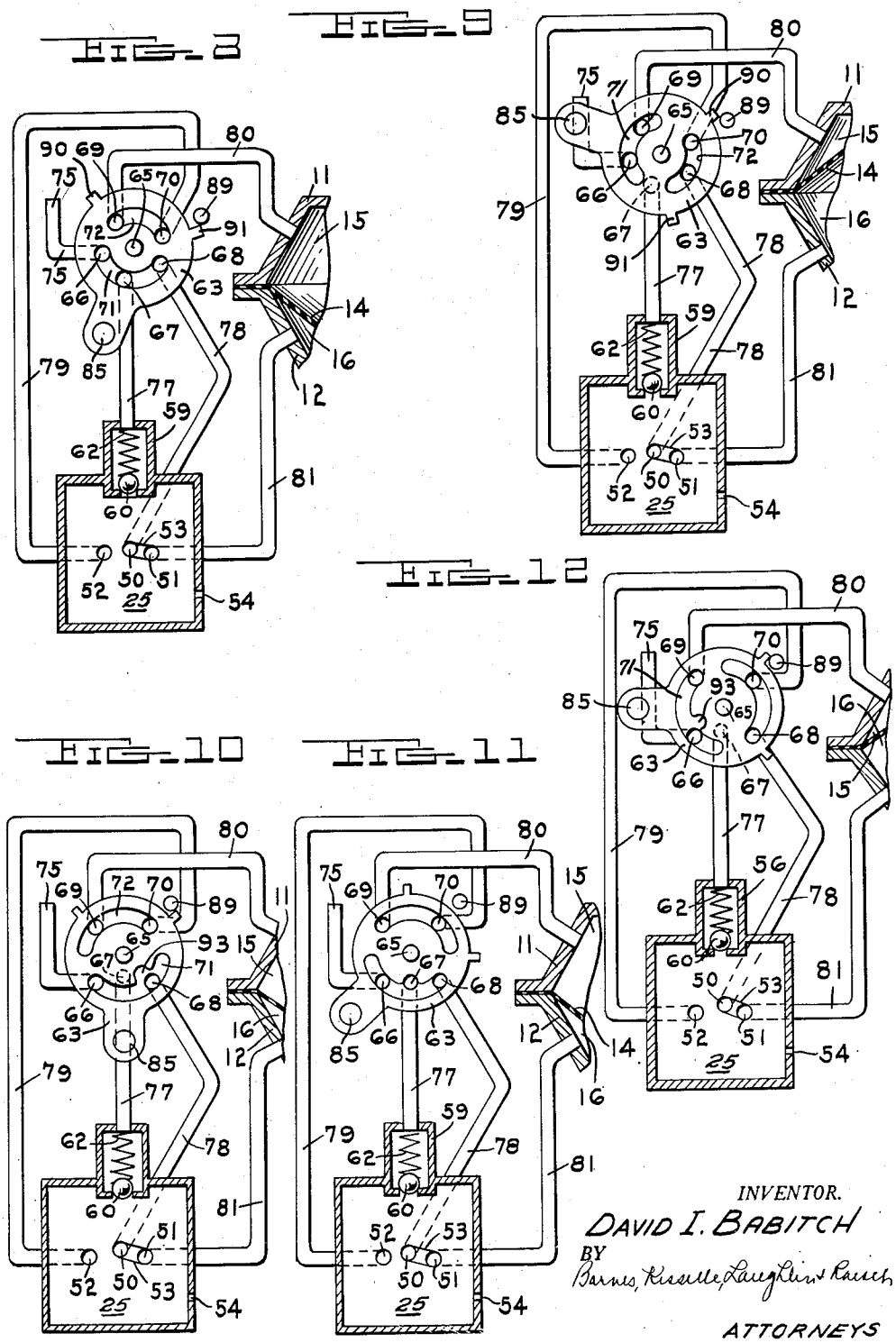

Patented Dec. 23, 1952

2,622,399

UNITED STATES PATENT OFFICE 2,622,399

WINDSHIELD WIPER MOTOR

David I. Babitch, Detroit, Mich.

Application August 5, 1948, Serial No. 42,576

14 Claims. (Cl. 60—60)

This invention relates to fluid motors and particularly to fluid motors commonly used for operating windshield wipers on a vehicle by means of air pressure.

Most commonly, fluid motors of this type utilize as their source of power the vacuum pressure obtaining in the engine manifold of the vehicle. The use of this vacuum source of power is however associated with objectionable operational characteristics of the fluid motor. The range of pressure obtaining in the manifold of an internal combustion engine under different conditions of operation reflects directly the power supplied to the fluid motor and when it is considered that this pressure varies from about one-half inch of mercury to as much as twenty-five inches of mercury, it can be seen that the speed of the motor, which varies directly with the power supplied, fluctuates between very wide limits. Unless the power supplied to the motor in such a system is controlled, the wiper blade will at times, such as when the throttle is suddenly opened wide, oscillate at too slow a speed for efficient and satisfactory wiping action and at other times, such as when the throttle is suddenly closed, the speed of the wiper will be too high for effecting a satisfactory wiping action.

The main object of this invention is to produce a fluid motor the speed of which is controlled so that the wiper blades operate within a very narrow range of speed which produces a most efficient wiping action.

More specifically it is an object of this invention to produce a fluid motor which is designed to give a satisfactory wiping action within a very low range of power available by utilizing the full differential pressure available in the low vacuum range, and preventing the overspeeding of the motor in the high vacuum range by maintaining the differential pressure within the motor at a substantially constant level.

Another object of the invention is to provide manual control means on the motor which is effective in one position to maintain the pressure differential in the motor within a relatively narrow range so as to control the speed of the motor to a desired reduced value, and in another position render the speed control means ineffective so as to supply the motor with the maximum available power.

It is a further object of this invention to produce a fluid motor the operating mechanism of which is completely enclosed within a sealed casing, thus eliminating the necessity for providing numerous stuffing boxes and like sealing means which materially increase the frictional resistance of a motor and at the same time effectively protect the operating mechanism from the deleterious effects of dirt and dust of the atmosphere.

Another object of this invention is to produce a windshield wiper motor which employs a minimum of precision parts, which is of simple design, which can be manufactured at a relatively low cost, and at the same time a motor which is not only reliable but actually superior in its operation to present design fluid motors of this type.

Other objects and improvements in the way of design and operation will become apparent from the following description and drawings in which Figure 1 is a cross sectional view of the motor.

Figure 2 is an end view of the motor with the end cover plate removed.

Figure 3 is a fragmentary sectional view taken along lines 3—3 in Figure 2.

Figure 4 is a fragmentary top view of the motor with the manually controlled rotary valve removed.

Figure 5 is a sectional view taken along lines 5—5 in Figure 1.

Figure 6 is a view similar to Figure 4 but with the rotary valve in assembled position.

Figure 7 is a fragmentary view taken along lines 7—7 in Figure 1.

Figures 8 and 9 are diagrammatic views of the motor showing the fluid passages for the operating and park position of the manually controlled rotary valve.

Figures 10, 11, and 12 are diagrammatic views of a modified form of motor showing the fluid passages for the uncontrolled speed operation, controlled speed operation, and park positions of the manually controlled rotary valve.

As is illustrated in Figures 1 and 2, the motor is enclosed within a casing 10 which comprises two die cast sections 11 and 12 which are secured together as by screws 13 and between the abutting faces of which is clamped a flexible diaphragm 14 which serves as an effective seal between the sections. Casing sections 11 and 12 are shaped to provide two circular vacuum chambers 15 and 16 separated from each other at all times by diaphragm 14. Diaphragm 14 is backed on each side by rigid discs 17 which are clamped together by means of a nut 18 threaded on the upper end of a serrated rack 19, see Figure 7.

Diaphragm 14 is preferably made from a flat sheet of coated fabric having a larger diameter than that of chambers 15 and 16 so that when a source of vacuum is applied to either one side of the diaphragm or the other it moves from the end wall of one of the chambers to the end wall of the other chamber. The size of the diaphragm is limited however so that when it is fully extended discs 17 are spaced slightly from the respective adjacent end walls of chambers 15 and 16. This feature eliminates noise which would otherwise occur if the discs 17 were permitted to abut against the walls of the vacuum chambers at the end of each stroke.

Rack 19 is mounted to reciprocate with diaphragm 14 in an elongated guide bearing 20 formed integral with and depending from casing section 12 and is arranged to engage a segment pinion 21. Pinion 21 is mounted on a non-circular portion of an operating shaft 22 which is journalled in casing section 12. Shaft 22 is sealed within casing 12 at each side of pinion 21 by means of annular sealing rings 23 made of a resilient, oil resistant material. At one end shaft 22 is enlarged as at 24, which end extends outwardly beyond casing 12 for connection with a wiper oscillating mechanism (not shown) as by means of a pulley 18'. At the other end shaft 22 projects into a chamber 25 which is formed integral with casing 12 and sealed at the end by a removable cover plate 26.

The end of shaft 22 extending into chamber 25 drives an over center snap mechanism which automatically reverses the application of a pressure differential on the two sides of diaphragm 14 at the end of each stroke of the wiper blade (not shown). The automatic valve control mechanism preferably comprises a pin 30 mounted on the end of shaft 22 and having a lost motion connection with a U-shaped support bracket 31 which is pivotally supported at its open end on shaft 22. One leg of bracket 31 is turned outwardly as at 32 and provided with a pair of spaced ears 33 against which pin 30 is arranged to abut when shaft 22 is oscillated. The loop end of bracket 31 is shaped to provide a seat 34 for one end of a coiled compression spring 35. The other end of spring 35 is fitted with a retaining disc 36 which is slotted to receive a lug 37 depending from a valve operating arm 38. Arm 38 is also pivoted on shaft 22 as at 39. A pin 40 through the lower end of lug 37 maintains spring 35 in the compressed condition so as to apply an upward force on the lower end of lug 37. Lug 37 is struck out from arm 38 so as to form an upturned yoke portion 41 at one end of arm 38 which straddles shaft 22 and backs up against the inner face of bracket 31. Adjacent its other end, arm 38 carries an oscillating slide valve 42 which engages a valve seat 43 within chamber 25. Valve 42 is retained on arm 38 by means of a boss 47 of non-circular cross section which projects through a similarly shaped hole in arm 38. The body portion of valve 42 adjacent boss 47 is provided with tapering faces as indicated at 48, which construction permits valve 42 to seat itself on seat 43 independently of any tilting forces which might be imparted to it by arm 38. It will be noted that the upward force applied by spring 35 to arm 38 through lug 37 is offset with respect to the pivotal bearing 39 of arm 38 on shaft 22. This produces a force couple which tends to maintain valve 42 against valve seat 43 with sufficient pressure as to always afford a seal between these members. In order to reduce the noise associated with this over center snap mechanism as much as possible the upper end of arm 38 is fitted with a rubber bumper member 44 which engages with suitably positioned stops 45 and 46 to limit the travel of the valve in each direction. Likewise the loop end of bracket 31 also carries a rubber bumper member 49 which engages the side walls of chamber 25.

Valve seat 43 is provided with three circumferentially spaced ports, a central suction supply port 50, and chamber ports 51 and 52 at each side of port 50. Valve 42 is provided with a recess 53 on its inner face which in one position of the valve is arranged to connect port 50 with port 51 to supply suction to chamber 16 and in the other position of the valve connects the suction supply port 50 with port 52 to supply suction to chamber 15. Valve 42 is also proportioned so that when it connects two of the ports the remaining port is open to chamber 25 so that when suction is applied to one side of diaphragm 14, the other side of the diaphragm is subjected to the pressure obtaining in chamber 25.

One of the principal features of the invention concerns the means for maintaining an automatically variable partial vacuum in chamber 25. Chamber 25 is open to the atmosphere only through a restrictive orifice 54 in a wall of chamber 25 which communicates with an air supply chamber 55. Chamber 55 contains an air filtering material 56 and communicates directly with the atmosphere through a large opening 57 closed by a screen 58. Chamber 25 is also connected in parallel with the suction supply by means of a check valve 59 which is preferably in the form of a ball member 60 seated within an opening 61 in chamber 25 and loaded by means of a spring 62 which acts to maintain ball 60 seated in opening 61. Means in the form of a screw 29 is provided for adjusting the tension of spring 62.

Check valve 59 connects with the power source through a rotary valve assembly on casing 11. This valve assembly consists of a manual control valve head 63 which is mounted for rotative movement on a valve seat 64 by means of a threaded screw 65. Valve seat 64, as is best shown on Figure 4, is pierced by five circumferentially spaced ports, a suction supply port 66, a speed control port 67, an operating port 68, an upper chamber transfer port 70, and a combined upper chamber transfer port and parking port 69. The under face of valve head 63 is provided with two arcuate grooves 71 and 72 which control the passage of suction through the various ports. In the operating position, as shown in Figure 5, groove 71 connects ports 66, 67 and 68 and groove 72 connects the upper chamber transfer ports 69 and 70. In the park position of head 63, indicated diagrammatically in Figure 9, groove 71 connects ports 66 and 69 while groove 72 connects port 68 with port 70.

Suction supply port 66 connects by means of a passage 75 with a source of suction supply, preferably a conduit 76 leading from the engine manifold (not shown). Speed control port 67 connects with the check valve 59 by means of a passage 77. Ports 68 and 50 are connected by a passage 78 and ports 70 and 52 by a passage 79. Port 69 communicates directly with upper chamber 15 through a passage 80 while port 51 is placed in communication with lower chamber 16 through a passage 81. These passages are shown diagrammatically in Figures 8 and 9 and may be formed in the respective casing sections by means conventional in the art of die casting.

Valve head 63 is arranged to be actuated manually to either the operating or park position by means of a conventional cable 84 within a flexible casing 82 leading from a control knob on the dash panel of the vehicle. Cable 84 is connected with valve head 63 by means of a stud 85 seated in lug 86 projecting radially of head 63 and formed integrally therewith. The upper end of stud 85 is enlarged to form a head 87. A spring plate member 88 fixedly mounted on casing 11 by screw 65 and a post 89 is shaped to resiliently engage the upper face of valve head 63 and the head 87 of stud 85 so as to effectively seal head 63 on seat 64 while permitting movement of the valve head relative to the seat and also to prevent stud 85 from becoming disengaged from lug 86. Outer casing 92 is anchored on plate 88 as at 94. A pair of spaced projections 90 and 91 on head 63 are arranged to engage post 89 and limit the movement of the head relative to the valve seat from the operating position shown in Figure 8 to the park position indicated in Figure 9.

With the manual control valve head 63 set in the operating position indicated in Figure 8 vacuum is applied to lower chamber 16 through passage 75 to port 66, then to port 68 by means of groove 71, through passage 78 to port 50 of valve seat 43, then through recess 53 to port 51 and through passage 81 to chamber 16. Upper chamber 15 is in communication with the atmosphere through orifice 54, chamber 25 to port 52, through passage 79 to port 70, then through groove 72 to port 69 and to chamber 15 through passage 80. This pressure differential between the two chambers causes diaphragm 14 to move downwardly which in turn rotates shaft 22. After the shaft has rotated through a predetermined angle pin 30 has rotated bracket 31 over to the other side of center position and valve head 42 is snapped over center to connect ports 50 and 52 and open port 51 to chamber 25. This reverses the flow and suction is then applied to upper chamber 15 through passage 75 to port 66, then through groove 71 to port 68, through passage 78 down to port 50, then through recess 53 (valve 42 having shifted to the other side) to port 52, up through passage 79 to port 70 in valve seat 64, through groove 72 to port 69 and then to chamber 15 through passage 80. The lower chamber then communicates directly with chamber 25 through passage 81 and port 51.

It will be observed that when the motor is operating the vacuum pressure obtaining at the suction supply port 66 is also applied to check valve 59 through groove 71, port 67, and passage 77. Check valve 59 is set to release at a predetermined pressure differential so that whenever the vacuum at the suction supply port 66 exceeds the counter-vacuum in chamber 25 by a predetermined amount, ball 60 will be unseated and the vacuum will be bled down. This produces a two-fold result. The vacuum in the diaphragm chamber being exhausted will be reduced and at the same time chamber 25 will be partially exhausted. Orifice 54 is controlled in size such that check valve 59 is capable of exhausting this chamber at a greater rate than air at atmospheric pressure can flow into the chamber through the orifice. Chamber 25 is thereby maintained at an automatically varying partial vacuum dependent upon and varying in accordance with the changes in the vacuum pressure provided by the engine manifold. Since the vacuum chamber on the atmosphere side of the diaphragm communicates with chamber 25 it will be apparent that not only is the amount of vacuum on one side of the diaphragm reduced but the pressure on the other side of the diaphragm is correspondingly cut down. In this manner the pressure differential to which the diaphragm is subjected is maintained at a comparatively constant predetermined value, and since the speed of the wiper varies directly with the differential pressure, the number of oscillations per minute of the wiper blade will also be substantially uniform.

It will be appreciated that by maintaining the pressure differential at a predetermined value, that is, by balancing the excessively high vacuum of the power source by a counter vacuum in chamber 25, the motor can be designed to give a satisfactory wiping action within the lowest ranges of power available. In this manner the motor can be designed from the standpoint of reducing the friction to a minimum. It also enables the use of a very light spring in the snap over mechanism. The partial vacuum obtaining in chamber 25 also reduces the sliding friction of valve 42 on seat 43 since the differential pressure across the valve is substantially reduced.

When the valve head 63 is shifted to the park position shown in Figure 9 the suction of the power source is applied directly to the upper chamber 15 through passage 75 to port 66 and then through groove 71 to port 69 and through passage 80 to the upper chamber 15. The lower chamber 16 will be subjected to the pressure obtaining in chamber 25 which will cause diaphragm 14 to move upwardly. It will be noted however that since ports 70 and 68 are connected by groove 72 and are cut off from communication with the power source, valve 43 is ineffective to admit suction to the lower chamber 16 and the diaphragm will remain at the upper end of chamber 15. It will also be observed that in the park position valve head 63 is disposed such that port 67 which connects with check valve 59 through passage 77 is likewise cut off from communication with the suction supply and is therefore ineffective to reduce the differential pressure on the diaphragm or to bleed unwanted air into the engine manifold.

In the modified form of motor shown diagrammatically in Figures 10, 11 and 12, the general arrangement is substantially the same as the form previously described with the exception that the speed control port 67 on valve seat 64 is offset radially inwardly relative to the remaining circumferentially spaced ports 66, 68, 69 and 70. Likewise the circumferentially recessed groove 71 on valve head 63 is provided with an inwardly projecting portion 93 which in one position of head 63 (Figure 11) is adapted to place port 67 in communication with operating port 68 and suction supply port 66 so that in normal operation of the motor the differential pressure on the diaphragm is limited by the action of check valve 59 as in the design previously described.

During abnormal climatic conditions, such as a heavy snow storm, it may be desirable to utilize all the available power to operate the windshield wiper and in such instances valve head 63 is manually actuated to the position shown in Figure 10. In this position it will be observed that the offset portion 93 of groove 71 is out of registry with port 67 and check valve 59 is rendered ineffective to control or diminish the speed of the motor. Under such circumstances the diaphragm will be subjected to the high vacuum obtaining in the engine manifold and the maximum speed and power of the wiper will be maintained.

As in the previously described embodiment when valve head 63 is shifted to park position shown in Figure 12 the suction supply communicates directly with the upper chamber 15 through passage 75, port 66, groove 71, port 69 and passage 80. Since groove 71 is out of registry with operating port 68, the diaphragm will be moved upwardly in chamber 15 and the snap over mechanism will be ineffective to reverse the flow to the bottom chamber 16. At the same time check valve 59 is out of communication with the suction supply since port 67 is covered by the solid portion of head 63 and the underside of diaphragm 14 is subjected to the atmospheric pressure obtaining in chamber 25.

I claim:

1. A pneumatic motor comprising a chamber, means dividing said chamber into two compartments and movable in said chamber in response to a pressure differential on opposite sides of said means, a port for each of said compartments, a second chamber, a valve for alternately connecting one of said ports with a source of vacuum and the other with a body of gas at higher pressure in said second chamber, and means responsive to a predetermined pressure differential between said source of vacuum and said body of gas at higher pressure for connecting the source of vacuum with said body of gas at higher pressure to create a partial vacuum in said second chamber and thereby tend to maintain the effective pressure differential on opposite sides of said movable means at a constant value.

2. A pneumatic motor comprising a chamber, means dividing said chamber into two compartments and movable in said chamber in response to a pressure differential on opposite sides of said means, a port for each of said compartments, a valve for alternately connecting one of said ports with a source of vacuum and the other with a body of gas at a pressure higher than said source of vacuum but below atmospheric pressure, and means responsive to a predetermined pressure differential between said source of vacuum and said body of gas at higher pressure for connecting the source of vacuum with said body of gas at higher pressure to thereby maintain the effective pressure differential on opposite sides of said movable means at a substantially constant value.

3. A pneumatic motor comprising a chamber, means dividing said chamber into two compartments and movable in said chamber in response to a pressure differential on opposite sides of said means, a port for each of said compartments, a valve for alternately connecting one of said ports with a source of vacuum and the other with a body of gas at higher pressure, means responsive to a predetermined pressure differential between said source of vacuum and said body of gas at higher pressure for connecting the source of vacuum with said body of gas at higher pressure to decrease the pressure of said body of gas at higher pressure and thereby tend to maintain the effective pressure differential on opposite sides of said movable means at a constant value, and a restrictive orifice connecting said body of gas at higher pressure with the atmosphere.

4. The combination as set forth in claim 3 wherein the size of said restrictive orifice is such that the orifice is ineffective to maintain said body of gas at atmospheric pressure when said source of vacuum is connected with said body of gas by said pressure responsive means.

5. A pneumatic motor comprising a chamber, means dividing said chamber into two compartments and movable in said chamber in response to a pressure differential on opposite sides of said movable means, a port for each of said compartments, a valve for alternately connecting a source of vacuum with each of said ports, a second chamber containing gas at a pressure higher than said source of vacuum, and means responsive to a predetermined pressure differential between said source of vacuum and said second chamber for connecting said source of vacuum with said second chamber to reduce the pressure in said second chamber below atmospheric and thereby tend to maintain the effective pressure differential on opposite sides of said movable means at a constant value.

6. A pneumatic motor comprising a chamber, a diaphragm dividing said chamber into two compartments and movable in said chamber in response to a pressure differential on opposite sides of said diaphragm, a port for each of said compartments, a valve for alternately connecting a source of vacuum with each of said ports, a second chamber containing gas at a pressure higher than at said source of vacuum, a check valve responsive to a predetermined pressure differential between said source of vacuum and said second chamber for connecting the source of vacuum with said second chamber, and a restrictive orifice connecting said second chamber with the atmosphere, said orifice and check valve being proportioned in size such that said second chamber is maintained at a partial vacuum when the suction of said source of vacuum is sufficient to open said check valve.

7. The combination as set forth in claim 6 including means for selectively rendering said check valve ineffective to connect said source of vacuum with said second chamber.

8. The combination as set forth in claim 6 including means for adjusting said check valve to open at a desired pressure differential between said source of vacuum and said second chamber.

9. A pneumatic motor comprising a casing, a chamber within said casing, means dividing said chamber into two compartments and movable in said chamber in response to a pressure differential on opposite sides of said movable means, a port for each of said compartments, a second chamber in said casing, said second chamber being connected with the atmosphere, a valve for alternately connecting one of said ports with a source of vacuum and the other with said second chamber, and means responsive to a pressure differential between said source of vacuum and said second chamber for bleeding the vacuum down to said second chamber to thereby decrease the pressure in said second chamber and tend to maintain the effective pressure differential on opposite sides of said movable means at a constant value.

10. A pneumatic motor comprising a casing, a chamber within said casing, means dividing said chamber into two compartments and movable in said chamber in response to a pressure differential on opposite sides of said movable means, a port for each of said compartments, a second chamber in said casing, a valve for alternately connecting one of said ports with a source of vacuum and the other with said second chamber, means responsive to a pressure differential between said source of vacuum and said second chamber for bleeding down said source of vacuum to said second chamber, and a restrictive orifice connecting said second chamber with the atmosphere, said orifice serving to maintain said second chamber at a pressure below atmospheric when said source of vacuum is bled down through said second chamber whereby the vacuum in the compartment connected with said source of vacuum is reduced and the pressure in the compartment connected with said second chamber is likewise reduced.

11. A pneumatic motor comprising a casing having a chamber therein, a diaphragm movable in said chamber in response to a pressure differential on opposite sides of said diaphragm and dividing said chamber into two compartments, a second chamber in said casing, said second chamber having therein a vacuum supply port and a pair of operating ports, said operating ports being connected one with one of said compartments and the other with the other compartment, a valve for alternately opening one of said operating ports to said second chamber and connecting the other with a source of vacuum through said vacuum supply port, means forming a passageway connecting said second chamber with said source of vacuum, a check valve in said passageway arranged to open in response to a predetermined pressure differential between said source of vacuum and said second chamber, said check valve serving to bleed down the vacuum at said vacuum supply port by exhausting said second chamber, and a restrictive orifice connecting said second chamber with the atmosphere, said check valve and orifice being proportioned in size such that said second chamber is maintained at a partial vacuum when said check valve is open.

12. A pneumatic motor comprising a casing having a valve seat thereon, said valve seat having a vacuum supply port adapted for connection with a source of vacuum, an operating port, a speed control port, and a parking port, means associated with said speed control port for bleeding down the vacuum at said vacuum supply port, and a valve head member mounted on said valve seat and manually shiftable to connect said vacuum supply port selectively with said operating and speed control ports or with said parking port.

13. A pneumatic motor comprising a casing having a chamber therein, a member dividing said chamber into two compartments and movable in said chamber in response to a pressure differential on opposite sides of said member, said casing having a valve seat thereon, said valve seat having a vacuum supply port adapted for connection with a source of vacuum, an operating port, a speed control port, and a parking port, valve means on said casing for alternately connecting each of said compartments with said operating port, a passageway connecting said parking port with one of said compartments, a valve head member rotatably mounted on said valve seat and shiftable to a first position to connect said vacuum supply port with said operating and speed control ports and to a second position to connect said vacuum supply port with said parking port, and means associated with said speed control port for bleeding down the vacuum at said vacuum supply port when said valve head member is shifted to said first position.

14. A pneumatic motor comprising a casing having a chamber therein, a member dividing said chamber into two compartments and movable in said chamber in response to a pressure differential on opposite sides of said member, said casing having a valve seat thereon, said valve seat having a vacuum supply port adapted for connection with a source of vacuum, an operating port, a speed control port, and a parking port, valve means on said casing for alternately connecting each of said compartments with said operating port, a passageway connecting said parking port with one of said compartments, a valve head member rotatably mounted on said valve seat and shiftable to a first position to connect said vacuum supply port with said operating and speed control ports, to a second position connecting said vacuum supply port with said parking port, and to a third position wherein said vacuum supply port is connected with said operating port and cut off from communication with said speed control port, and means associated with said speed control port for bleeding down the vacuum at said vacuum supply port when said valve head member is disposed in said first position.

DAVID I. BABITCH.

REFERENCES CITED

The following references are of record in the file of this patent:

UNITED STATES PATENTS

| Number | Name | Date |
|---|---|---|
| 1,321,117 | Meunier | Nov. 11, 1919 |
| 2,069,016 | Newton | Jan. 26, 1937 |
| 2,086,252 | Winchell | July 6, 1937 |
| 2,140,458 | Kuskin | Dec. 13, 1938 |
| 2,291,881 | Coffey | Aug. 4, 1942 |